Oct. 18, 1949.   H. HANSEN ET AL   2,485,380
PRESSURE INDICATOR AND CONTROL VALVE
Filed April 21, 1945

Inventors:
Harold Hansen
Lawrence Seefeldt
By
Attorney

Patented Oct. 18, 1949

2,485,380

UNITED STATES PATENT OFFICE 2,485,380

PRESSURE INDICATOR AND CONTROL VALVE

Harold Hansen and Lawrence Seefeldt, Manitowoc, Wis., assignors to Aluminum Goods Manufacturing Company, Manitowoc, Wis.

Application April 21, 1945, Serial No. 589,677

9 Claims. (Cl. 137—53)

The present invention relates to pressure indicator and control valves, and more particularly to a gravity type relief valve.

While use of the present valve has wide application, it is particularly adaptable to conventional domestic pressure cookers. Therefore, for the purpose of explanation, the invention will be described and illustrated in connection with cookers of the foregoing character.

Because the maintenance of accurate predetermined pressure is highly important and essential in pressure cookers, in order to correctly determine the proper period of operation, the pressure must be accurately controlled, and for practical purposes its regulation must be automatic.

At the present time there are three types of pressure relief valves in common use, namely, the weight or gravity type valve, an adjustable spring type control valve, and the resilient blow-off plug.

As far as is known, in conventional gravity valves, no means have been provided for varying the capacity of the valve to compensate for different predetermined pressures, the weight of the valve remaining constant to relieve pressure only at one predetermined value.

In connection with spring actuated valves, considerable difficulty has been encountered due to fouling as a result of abuse, and neglect in periodically cleaning the valve. Furthermore while a spring relief valve may be adjusted for various measured pressures, it is necessary to equip the pressure receptacle with a dial gauge to enable its operator to properly set or adjust the valve for release at the desired pressure. This not only adds to the expense of the apparatus, but is objectionable because of deterioration and often failure of the dial gauge after a limited period of use, or as the result of abuse, such as submerging the gauge in water when cleaning the pressure receptacle.

As a matter of fact it is now customary for owners of pressure gauges to periodically return the dial gauges to the factory for conditioning and correction, which involves both inconvenience and expense.

Resilient blow-off plugs now in use are inexpensive but objectionable for numerous reasons. In the first place no means of varying the pressure at which the plug is released is possible. Therefore, plugs of different resistance must be provided for different predetermined pressures. In addition to the foregoing, resilient plugs are inaccurate, and deteriorate rapidly from the effects of grease and high temperatures. Also an awkward and difficult operation for the housewife or user is required in replacing the plug after displacement.

It is, therefore, the primary object of the present invention to overcome the foregoing objections by the provision of an exceedingly simple, economical and accurate pressure indicator and control valve of the gravity type, which may be easily regulated to maintain a plurality of desired predetermined pressures without the aid of a dial gauge, and which will not deteriorate or vary through use or abuse.

Incidental to the foregoing, a more specific object of the invention resides in the provision of a relief valve including, a weight having selected means for controlling release of pressure at a plurality of predetermined amounts.

A further object is to furnish a relief valve in which a weight is provided with a plurality of different selective areas affected by various predetermined amounts of pressure.

A more specific object is to provide a valve of the foregoing character comprising, a pressure outlet stem communicating with the interior of a pressure receptacle, and a gravity valve loosely positioned upon said stem in different selected positions to release the pressure in said receptacle at various predetermined amounts.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing are illustrated two complete examples of the physical embodiment of the present invention constructed according to the best mode so far devised for the practical application of the principles thereof.

Figure 1:
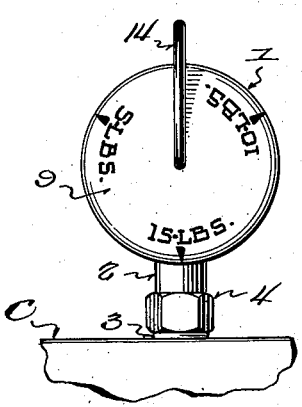
Fig. 1 is a front elevational view of a valve designed in accordance with one form of the present invention.
Figure 2:
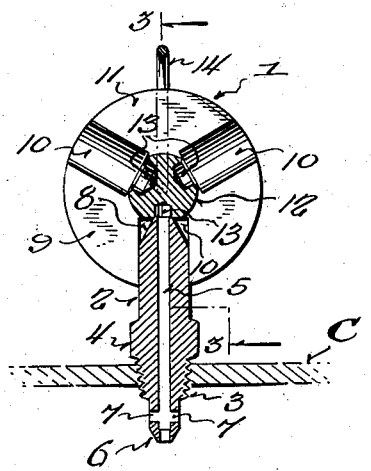
Fig. 2 is a vertical sectional view of the same taken on the line 2—2 of Fig. 3.
Figure 3:
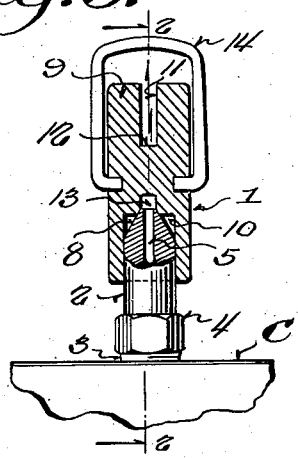
Fig. 3 is another sectional view taken on the line 3—3 of Fig. 2.

Referring now more particularly to the accompanying drawing, in that form of the invention illustrated in Figs. 1 to 3, C designates a fragmentary portion of the cover or wall of a pressure receptable, to which a gravity valve 1, comprising the present invention, is attached. The valve 1 comprises a stem 2, provided adjacent its lower end with a tapered thread 3 for securely connecting the stem to the receptacle cover C. Adjacent the thread 3, the stem is provided with an external hex or flattened surface 4, for reception of a wrench or other suitable tool. Extending axially through the stem 2 is a vent passage 5 communicating with the interior of the pressure receptacle. At its lower end the stem is provided with a taper 6 to reduce the bottom surface of the stem surrounding the vent to a minimum to prevent food particles, forced upwardly against the cover by the pressure carried within the receptacle, from becoming lodged against the end of the stem and obstructing the vent 5. As a further safety factor against clogging, the lower end of the stem is provided with a plurality of radial vents 7 intersecting the vent 5, any one of which permits the release of steam pressure in the event the others become obstructed. The upper end of the stem 2 is provided with an external tapered seat 8 surrounding the vent 5.

Loosely positioned upon the stem 2, is a weight valve 9 provided with a plurality of spaced radial recesses 10 for selective reception of the stem 2. Aligned with, and intersecting the recesses 10, the valve 9 has formed therein an annular exhaust groove 11, which creates a central core 12 provided with a plurality of pockets 13, of different size and capacity. In the operative position of the valve 9 seated upon the stem 2, the rim of the selected pocket 13, which is preferably provided with a slight taper, engages the tapered seat 8 of the valve stem 2, to normally seal the vent, and in the event of sufficient pressure to overcome the weight of the valve 9, the same is unseated and steam pressure is allowed to exhaust through the groove 11.

To facilitate handling of the valve, particularly its removal from the stem after it becomes heated during operation, a wire bale 4 is pivotally connected to the opposite faces of the valve, axially thereto.

Figure 4:
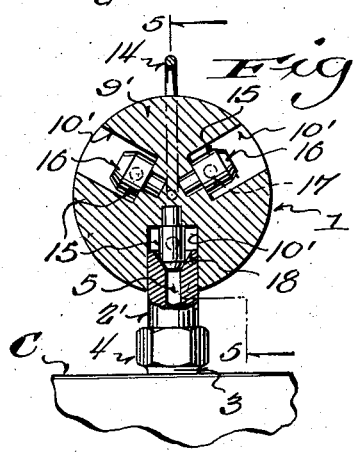
Fig. 4 is a vertical sectional view corresponding to Fig. 2, and illustrating a modification of the invention.
Figure 5:
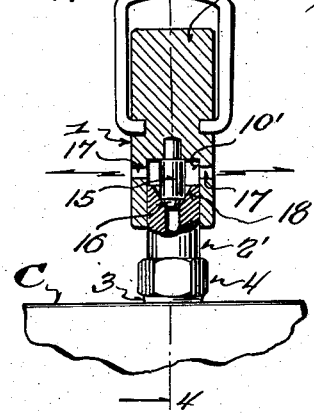
Fig. 5 is a vertical sectional view of the modified structure taken on the line 5—5 of Fig. 4.

In the modification of the invention illustrated in Figs. 4 and 5, instead of utilizing different size pockets 13, as heretofore described, the recesses 10' of the valve 9' are provided with plugs 15 of different diameter and having tapered ends 16 adapted to engage an internal tapered seat 18 formed in the top of the stem 2', thus presenting surfaces of different area to the pressure generated within the receptacle, and consequently determining the amount of pressure required to raise the valve for release of the pressure.

When raised the released pressure is exhausted through radial openings 17 communicating with the recesses 10' which receive the stem 2'.

For the purpose of explanation, operation of the present valve will be described in connection with a conventional domestic cooker. In using the cooker, food is placed in the receptacle with a small amount of water, after which the cover is securely locked and sealed on the receptacle. Heat is then applied with the gravity valve 9 removed from the stem 2. As pressure is generated within the receptacle, air is forced out through the stem 2. After the air has been exhausted from the receptacle, which is indicated by the escape of a steady stream of steam, the valve 9 is placed on the stem in any selected recess, indicated on the faces of the valve, and when the required pressure is generated within the receptacle, the valve is caused to dance slightly on top of the stem 2 and permit a small sizzle of escaping steam, which is an indication to the user that the heat should be reduced to avoid violent dancing and excessive loss of steam.

In the presence instance, the valves are shown provided with three controls for maintaining pressure at either 5, 10 or 15 pounds, which range is sufficient for ordinary cooking and canning. However, these may be varied, and the number of controls increased or reduced without departing from the invention.

When the required cooking time under the selected pressure is reached, the cooker is removed from the range or heating element, and set in a container of cold water, which promptly reduces the steam pressure, after which the valve 9 is removed from the stem 2 by means of a fork, or other convenient utensil for engaging the bale 14, to release any remaining pressure, and thus prevent possibility of injury to the operator by scalding during removal of the cover.

From the foregoing explanation considered in connection with the accompanying drawing, it will be apparent that an exceptionally simple and inexpensive pressure indicator and control valve has been provided, for automatically maintaining one of a plurality of selective pressures within a receptacle, and which do not require the presence of a dial pressure gauge for proper setting.

It will be further appreciated that the present valve is not affected by prolonged use or carelessness and abuse in handling, and inasmuch as the weight of the valve 9' is constant, extreme accuracy is assured at all times.

We claim:

1. A pressure control and relief valve comprising a valve stem having a passage therethrough, a valve member adapted to be seated upon said valve stem and to be held thereon by gravity, said valve member having a plurality of recesses adapted to be selectively fitted over the valve stem, the valve member being provided with contact edges in the recesses engaging the valve stem and exposing different effective areas to the outlet of the valve stem passage.

2. A pressure control and relief valve comprising a valve stem having a passage therethrough, a valve member adapted to be seated upon said valve stem and to be held thereon by gravity, said valve member having a plurality of recesses adapted to be selectively fitted over the valve stem, the valve stem having a conical surface concentric with the passage and the valve member being provided with contact edges in the several recesses to engage the conical surface on different planes and to expose different effective areas to the outlet of the valve stem passage.

3. A pressure control and relief valve comprising a valve stem having a passage therethrough, a valve member adapted to be seated upon said valve stem and to be held thereon by gravity, said valve member having a plurality of recesses adapted to be selectively fitted over the valve stem, the valve member being provided with contact edges in the recesses engaging the valve stem and exposing different effective areas to the outlet of the valve stem passage, and passages interconnecting the recesses.

4. A pressure control and relief valve comprising a valve stem having a passage therethrough, a valve member adapted to be seated upon said valve stem and to be held thereon by gravity, said valve member having a plurality of recesses adapted to be selectively fitted over the valve stem, the valve stem having an outer conical surface concentric with the passage, and the valve member recesses being each provided with a reduced recess in its base, these reduced recesses differing in size in the several recesses whereby the edges of the reduced recesses engage the conical surface of the stem at different planes and present different effective areas to the outlet of the valve stem passage.

5. A pressure control and relief valve comprising a valve stem having a passage therethrough, a valve member adapted to be seated upon said valve stem and to be held thereon by gravity, said valve member having a plurality of recesses adapted to be selectively fitted over the valve stem, the valve stem having an outer conical surface concentric with the passage, and the valve member recesses being each provided with a reduced recess in its base, these reduced recesses differing in size in the several recesses whereby the edges of the reduced recesses engage the conical surface of the stem at different planes and present different effective areas to the outlet of the valve stem passage, and passages connecting the valve member recesses to the outer surface of the valve member.

6. A pressure control and relief valve comprising a valve stem having a passage therethrough, a valve member adapted to be seated upon said valve stem and to be held thereon by gravity, said valve member having a plurality of recesses adapted to be selectively fitted over the valve stem, the valve stem having an inner conical surface terminating its passage, and the valve member recesses being each provided with a circular plug in its base, said plugs varying in diameter whereby the edges of said plugs engage the conical surface at different planes and present different effective areas to the outlet of the valve stem passage.

7. A pressure control and relief valve comprising a valve stem having a passage therethrough, a valve member adapted to be seated upon said valve stem and to be held thereon by gravity, said valve member having a plurality of recesses adapted to be selectively fitted over the valve stem, the valve stem having an inner conical surface terminating its passage, and the valve member recesses being each provided with a circular plug in its base, said plugs varying in diameter whereby the edges of said plugs engage the conical surface at different planes and present different effective areas to the outlet of the valve stem passage, and passages connecting the valve member recesses to the outer surface of the valve member.

8. A pressure control and relief valve comprising a valve stem having a passage therethrough, a valve member comprising a disc having a plurality of radial recesses formed therein, the recesses being adapted to be selectively fitted onto the valve stem and to be held thereon by gravity, the valve member being provided with contact edges in the recesses engaging the valve stem and exposing different effective areas to the outlet of the valve stem passage.

9. A pressure control and relief valve comprising a valve stem having a passage therethrough, a valve member comprising a disc having a plurality of radial recesses formed therein, the recesses being adapted to be selectively fitted onto the valve stem and to be held thereon by gravity, the valve members being provided with contact edges in the recesses engaging the valve stem and exposing different effective areas to the outlet of the valve stem passage, the valve member having a circumferential passage connecting the recesses, said passage being open to the periphery of the member.

HAROLD HANSEN.
LAWRENCE SEEFELDT.

REFERENCES CITED

The following references are of record in the file of this patent:

UNITED STATES PATENTS

| Number | Name | Date |
|---|---|---|
| 412,890 | Noack | Oct. 15, 1889 |
| 893,483 | Gray | July 14, 1908 |
| 1,682,203 | Vischer | Aug. 28, 1928 |
| 1,915,899 | Monro | June 27, 1933 |
| 2,200,903 | Stevens | May 14, 1940 |

FOREIGN PATENTS

| Number | Country | Date |
|---|---|---|
| 232,404 | Great Britain | Apr. 23, 1925 |